United States Patent
Itakura

(10) Patent No.: US 8,246,108 B2
(45) Date of Patent: Aug. 21, 2012

(54) PILLAR STRUCTURE OF VEHICLE BODY

(75) Inventor: Akira Itakura, Shizuoka-ken (JP)

(73) Assignee: Suzuki Motor Coporation, Shizuoka-Ken (JP)

( * ) Notice: Subject to any disclaimer, the term of this patent is extended or adjusted under 35 U.S.C. 154(b) by 203 days.

(21) Appl. No.: 12/732,319

(22) Filed: Mar. 26, 2010

(65) Prior Publication Data

US 2010/0244492 A1 Sep. 30, 2010

(30) Foreign Application Priority Data

Mar. 31, 2009 (JP) ................................. 2009-085255

(51) Int. Cl.
*B60N 99/00* (2006.01)

(52) U.S. Cl. ............................... 296/193.06; 296/187.12

(58) Field of Classification Search ............. 296/187.03, 296/187.12, 193.05, 193.06
See application file for complete search history.

(56) References Cited

U.S. PATENT DOCUMENTS

| | | | |
|---|---|---|---|
| 6,824,201 B2 * | 11/2004 | Miyazaki ................. | 296/193.06 |
| 7,243,983 B2 * | 7/2007 | Rashidy et al. .......... | 296/193.06 |
| 7,407,222 B2 * | 8/2008 | Anderson et al. ........ | 296/193.06 |
| 7,677,645 B2 | 3/2010 | Henkelmann | |
| 7,959,217 B2 * | 6/2011 | Onuma .................... | 296/187.12 |
| 2006/0208537 A1 * | 9/2006 | Dingman et al. ........ | 296/193.05 |
| 2008/0001434 A1 * | 1/2008 | Henkelmann ............ | 296/187.12 |
| 2008/0315628 A1 * | 12/2008 | Obayashi ................. | 296/193.06 |
| 2009/0085379 A1 * | 4/2009 | Takahashi et al. ....... | 296/193.06 |
| 2009/0152896 A1 | 6/2009 | Enderich et al. | |
| 2010/0038928 A1 * | 2/2010 | Onuma .................... | 296/187.12 |
| 2010/0194146 A1 * | 8/2010 | Nishimura et al. ...... | 296/193.06 |
| 2010/0194147 A1 * | 8/2010 | Aul et al. ................. | 296/193.06 |

FOREIGN PATENT DOCUMENTS

| | | |
|---|---|---|
| DE | 195 31 957 A1 | 3/1996 |
| DE | 101 62 741 A1 | 7/2003 |
| DE | 10 2006 021 883 A1 | 11/2007 |
| DE | 10 2006 027 546 A1 | 12/2007 |
| DE | 10 2009 006 449 A1 | 7/2010 |
| JP | 2002-120758 | 4/2002 |

OTHER PUBLICATIONS

Office Action for German Application No. 10 2010 002 789.8 dated Nov. 17, 2011.

* cited by examiner

*Primary Examiner* — Lori Lyjak

(74) *Attorney, Agent, or Firm* — Alston & Bird LLP

(57) ABSTRACT

A pillar structure of a vehicle body includes a pillar that forms a closed cross-sectional structure made up of an outer panel and an inner panel and that extends substantially along the vertical direction. The inner panel defines an opening and a reinforcing member is joined to a part including at least the periphery of the opening in the inner panel of the pillar.

4 Claims, 4 Drawing Sheets

PILLAR STRUCTURE OF VEHICLE BODY

BACKGROUND OF THE INVENTION

The present invention relates to a pillar structure of a vehicle body provided with a pillar extending substantially in the vertical direction.

In the side of a vehicle body, a front pillar, a center pillar, and a rear pillar are disposed, in that order, from the vehicle front side. In the lower part of the center pillar, a seat belt retractor for retracting a seat belt is incorporated.

In recent years, there has been a tendency for the seat belt retractor, provided additionally with various safety devices, to increase in size. Accordingly, there has been a tendency for an opening formed in the center pillar incorporating the seat belt retractor to increase in size.

On the other hand, in order to facilitate passengers getting into and getting out of a rear seat, an opening on the rear door must have a large opening area. However, an increase in the opening area on the rear door decreases the width between an opening edge of the center pillar and an opening edge of the rear door, so that the strength of that portion is reduced, and there arises a large difference in strength between that portion and a portion above the opening. Therefore, in the case of the application of an impact load to the center pillar from the side at the time of side collision of a vehicle, a problem occurs in that a portion around the opening having a low strength of the center pillar is deformed greatly to the inside of a vehicle compartment.

Also, since a rear door hinge for supporting a rear door is attached to the vehicle rear side of the center pillar, the deformation (intrusion amount) of the lower part of the center pillar to the inside of the vehicle compartment at the time of side collision of the vehicle tends to increase, especially on the vehicle rear side.

JP 2002-120758 A discloses a technique for restraining the general deformation of the center pillar at the time of side collision of the vehicle by using a high tension steel material as an inner panel and inner reinforcing members of the center pillar.

Unfortunately, if a high tension steel material is used as the inner panel and inner reinforcing members of the center pillar as proposed in JP 2002-120758 A, there arises a problem in that the formability of the inner panel of the center pillar is deteriorated, and additionally the material cost and the working cost increase.

In order to keep the deformation of the center pillar at the time of side collision of a vehicle small, it is conceivable to use a structure in which the strength is increased by increasing the thickness of the inner panel. However, the increase in the thickness of the inner panel reinforces locations that do not require high strength, which poses a problem of excessively increased weight and cost.

It is also conceivable to use a structure in which the strength of the center pillar is increased by increasing the material strength without increasing the weight. However, the use of high-strength material as the inner panel having an intricate shape poses a problem of difficulty in working.

SUMMARY OF THE INVENTION

Accordingly, an object of the present invention is to provide a pillar structure of a vehicle body, which is capable of restraining the deformation of a pillar to the inside of a vehicle compartment at the time of a side collision of the vehicle while keeping the increase in cost and weight to a minimum.

To achieve the above object, the present invention provides a pillar structure of a vehicle body, comprising a pillar that forms a closed cross-sectional structure.

The pillar comprises an outer panel and an inner panel and extends substantially along the vertical direction of the vehicle. The inner panel defines an opening therein, and a reinforcing member is joined to a part including at least the periphery of the opening of the inner panel.

According to another aspect of the present invention, the reinforcing member is configured so as to have a substantially L-shaped cross section as viewed from the vehicle vertical direction, and the reinforcing member is joined to a periphery part of the opening of the inner panel and to a longitudinal wall part substantially parallel with the vehicle width direction.

According to still another aspect of the present invention, the reinforcing member is joined to a surface on the outside in the vehicle width direction of the inner panel.

According to still another aspect of the present invention, the reinforcing member is joined to either one of the vehicle front and vehicle rear of the opening of the inner panel.

According to still another aspect of the present invention, the reinforcing member is joined to the side distant from a floor cross member in the vehicle longitudinal direction with respect to the opening of the inner panel.

According to the present invention, although high stresses concentrate at a periphery portion of the opening of the inner panel of the pillar at the time of side collision of a vehicle, since at least this portion is reinforced by the reinforcing member, the deformation of the pillar to the inside of a vehicle compartment can be restrained.

In this case, only the stress-concentrating portion is partially reinforced by the reinforcing member, so that the increase in cost and weight can be kept to a minimum.

According to the present invention, the reinforcing member having the substantially L-shaped cross section as viewed from the vehicle vertical direction is joined to a periphery part of the opening of the inner panel and to the longitudinal wall part substantially parallel with the vehicle width direction. Therefore, the resistance to an impact load applied to the center pillar from the side at the time of a side collision of a vehicle can be enhanced, whereby the deformation of the center pillar to the inside of the vehicle compartment can be restrained more effectively.

According to the present invention, since the reinforcing member is joined to the surface on the outside in the vehicle width direction of the inner panel, when a door opening flange is spot welded, the closed cross-sectional area of the pillar need not be decreased considering the interference of the reinforcing member with a welding gun. Furthermore, the longitudinal wall part of the surface substantially parallel with the vehicle width direction of the inner panel is brought close to a welding gun, and the cross-sectional shape viewed from the vehicle vertical direction of the inner panel can be set so that the closed cross-sectional area of the pillar is at a maximum, so that the strength and rigidity of the pillar can be enhanced.

According to the present invention, since the reinforcing member is joined to only either one of the vehicle front and vehicle rear of the opening of the inner panel (specifically, the side on which the deformation to the inside of the vehicle compartment at the time of side collision is large), the deformation of the pillar to the inside of the vehicle compartment at the time of side collision of a vehicle can be restrained while the increase in cost and weight is kept to a minimum.

According to the present invention, the reinforcing member is joined to the side distant from the floor cross member in the vehicle longitudinal direction with respect to the opening of the inner panel (the distant side is reinforced). Therefore, the impact load applied to the pillar at the time of side collision of a vehicle is transmitted to the floor cross member with high efficiency, so that the deformation of the pillar to the inside of the vehicle compartment caused by the impact load is kept small.

BRIEF DESCRIPTION OF THE DRAWINGS

Figure 1:
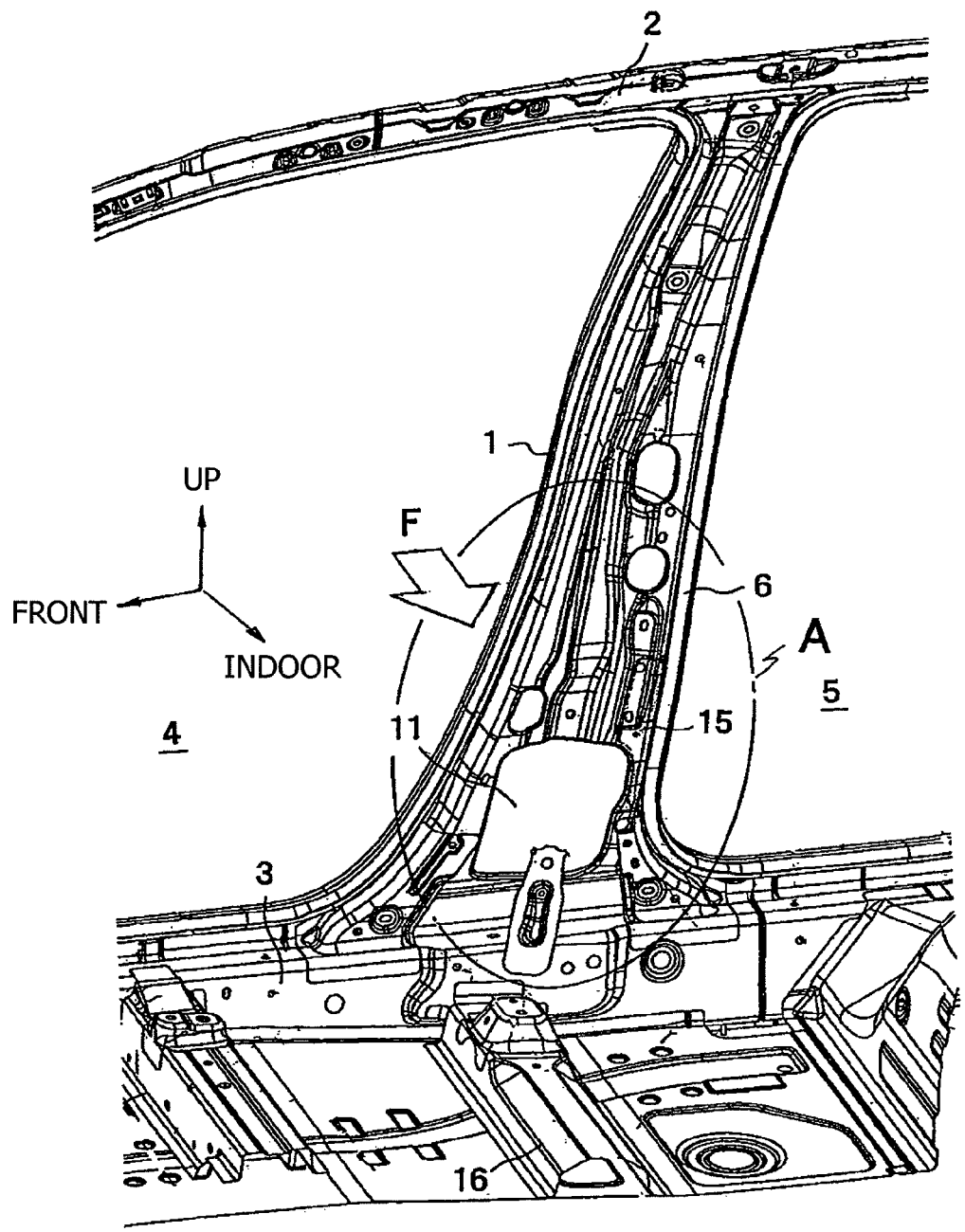
Figure 2:
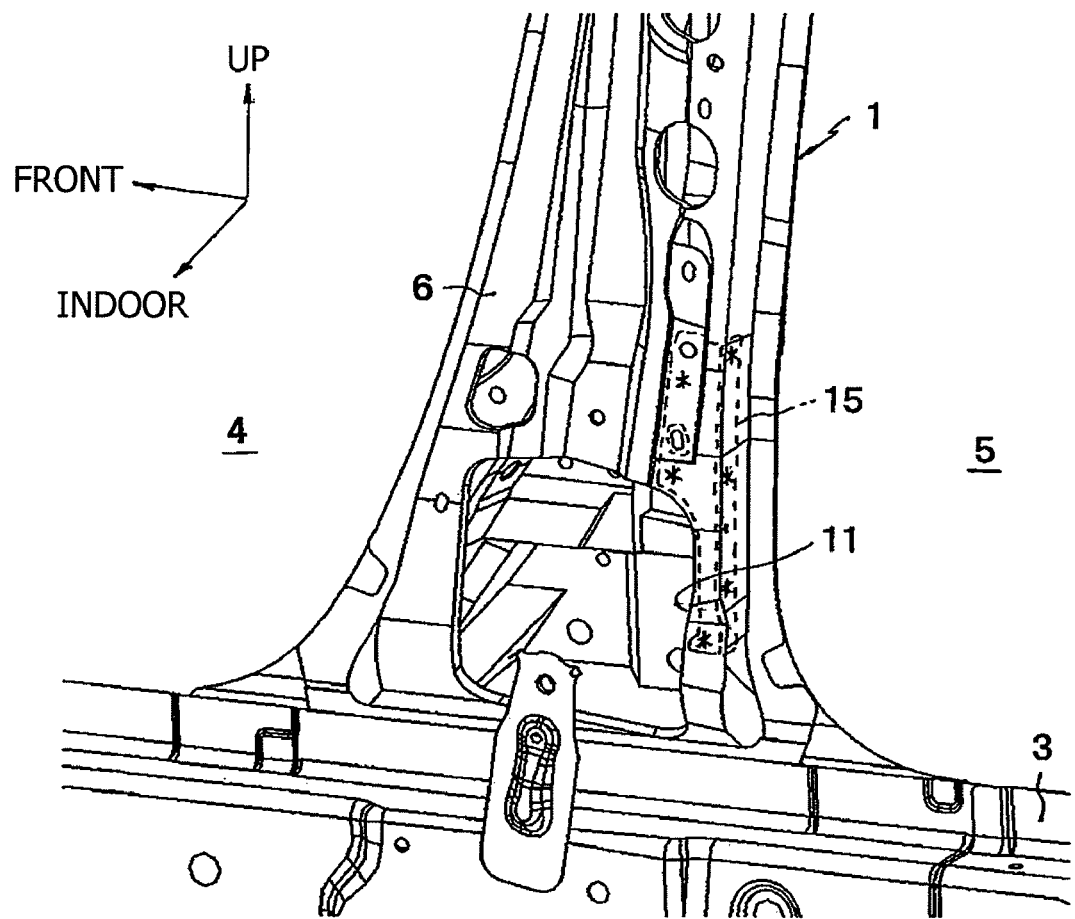
Figure 3:
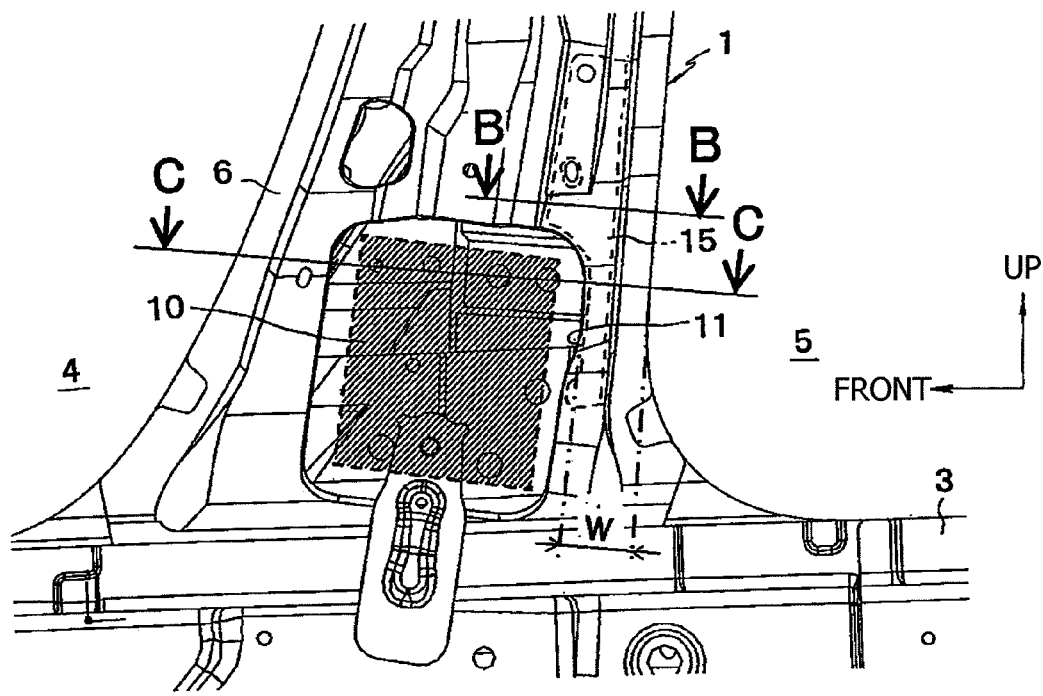
Figure 4:
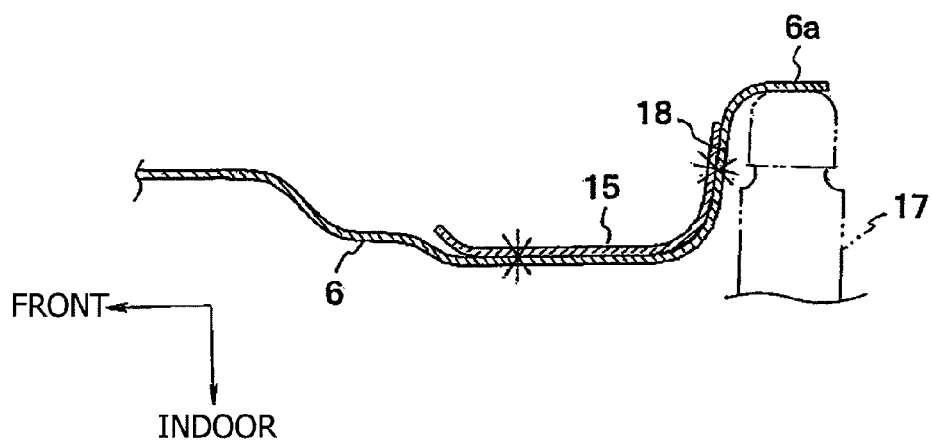

Having thus described the invention in general terms, reference will now be made to the accompanying drawings, which are not necessarily drawn to scale, and wherein:

FIG. 1 is a perspective view of a center pillar part of a vehicle provided with a pillar structure in accordance with the present invention, viewed from the inside of a vehicle compartment;

FIG. 2 is an enlarged detailed view of portion A of FIG. 1;

FIG. 3 is a side view of a center pillar lower part viewed from the inside of a vehicle compartment, showing a state in which a seat belt retractor is incorporated;

FIG. 4 is a sectional view taken along the line B-B of FIG. 3; and

Figure 5:
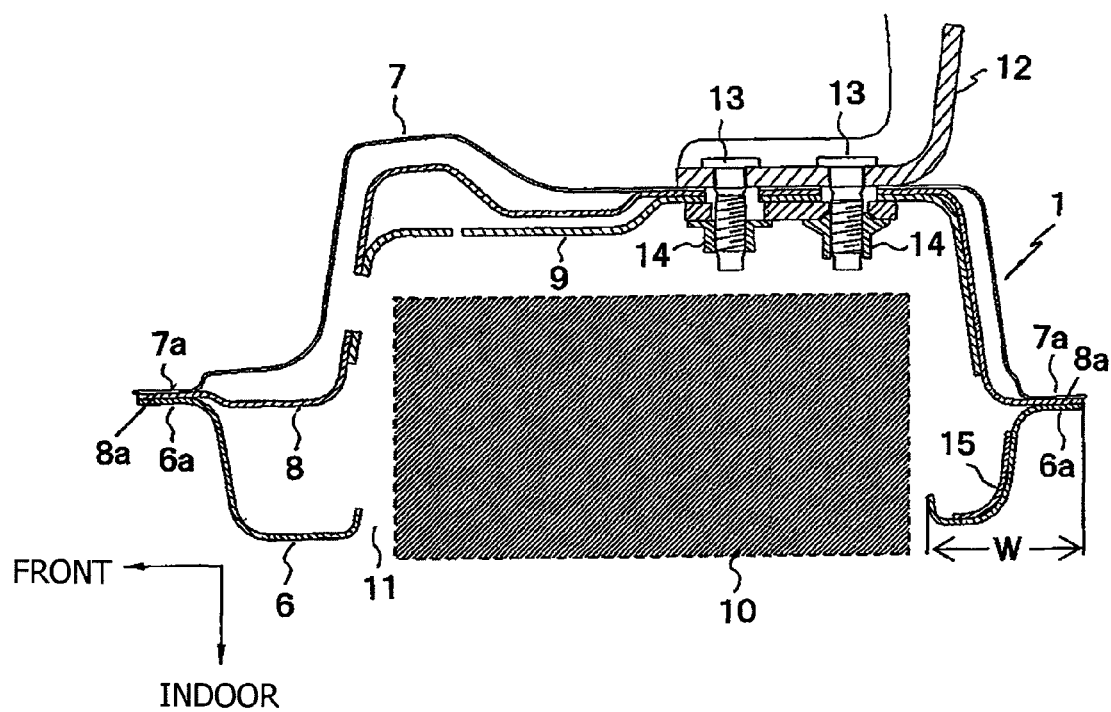

FIG. 5 is a sectional view taken along the line C-C of FIG. 3.

DETAILED DESCRIPTION OF THE DRAWINGS

The present invention now will be described more fully hereinafter with reference to the accompanying drawings, in which some but not all embodiments of the inventions are shown. Indeed, these inventions may be embodied in many different forms and should not be construed as limited to the embodiments set forth herein; rather, these embodiments are provided so that this disclosure will satisfy applicable legal requirements. Like numbers refer to like elements throughout.

FIG. 1 is a perspective view of a center pillar part of a vehicle provided with a pillar structure in accordance with the present invention, viewed from the inside of a vehicle compartment. FIG. 2 is an enlarged detailed view of portion A of FIG. 1. Also, FIG. 3 is a side view of a center pillar lower part viewed from the inside of the vehicle compartment, showing a state in which a seat belt retractor is incorporated. FIG. 4 is a sectional view taken along the line B-B of FIG. 3, and FIG. 5 is a sectional view taken along the line C-C of FIG. 3.

As shown in FIG. 1, a center pillar 1 extending substantially in the vertical direction is disposed in the central portion in the vehicle longitudinal direction at the side of a vehicle body. FIG. 1 shows only the center pillar 1 on one side (the right-hand side), and the same center pillar 1 is also provided on the other side (the left-hand side).

The upper end part of the center pillar 1 is connected to a roof side rail 2, and the lower end part thereof is connected to a side sill 3. On the vehicle front side of the center pillar 1, a front door opening 4 is formed. On the other hand, on the vehicle rear side of the center pillar 1, a rear door opening 5 is formed. The front door opening 4 and the rear door opening 5 are opened and closed by a front door and a rear door (both not shown), respectively. In addition, a floor cross member 16 extending in the vehicle width direction is provided on a floor surface in a vehicle compartment. Also, the floor cross member 16 is disposed on the front side with respect to the center of the center pillar 1 in the vehicle longitudinal direction. The end parts on the outside in the vehicle width direction of the floor cross member 16 are connected to the side sills 3.

The center pillar 1 is a vehicle body skeleton member having a closed cross-sectional structure extending substantially in the vertical direction. As shown in FIG. 5, the closed cross-sectional structure is formed by an inner panel 6 disposed on the inside in the vehicle width direction and an outer panel 7 disposed on the outside in the vehicle width direction. The closed cross-sectional structure contains a rear door hinge reinforcement 8 provided along the inner surface of the outer panel 7 and a center pillar reinforcement 9 joined to the inner surface of the rear door hinge reinforcement 8. The inner panel 6 is configured so as to have a shape such that the cross-sectional shape viewed from the vehicle vertical direction is open toward the outside in the vehicle width direction. The outer panel 7, the rear door hinge reinforcement 8, and the center pillar reinforcement 9 are configured so as to have a shape such that the cross-sectional shape viewed from the vehicle vertical direction is open toward the inside in the vehicle width direction.

The closed cross-sectional structure of the center pillar 1 is formed by lapping flanges 6a, 7a and 8a formed in the vehicle front and rear parts of the inner panel 6, the outer panel 7, and the rear door hinge reinforcement 8, respectively, on each other. Specifically, the closed cross-sectional structure of the center pillar 1 is formed by spot welding the flanges 6a, 7a and 8a of the inner panel 6, the outer panel 7, and the rear door hinge reinforcement 8, respectively. The center pillar reinforcement 9 is partially joined to the inner surface of the rear door hinge reinforcement 8.

In the lower part of the inner panel 6 of the center pillar 1, a rectangular opening 11 is formed in order to incorporate a seat belt retractor 10 shown in FIGS. 3 and 5. As shown in FIG. 5, a rear door hinge 12 for supporting the rear door (not shown) is attached to the vehicle rear side of a portion in which the outer panel 7, the rear door hinge reinforcement 8, and the center pillar reinforcement 9 lap on the opening 11 in the side view of the outer panel 7, the rear door hinge reinforcement 8, and the center pillar reinforcement 9. The rear door hinge 12 is installed by two bolts 13 and nuts 14 thread-mounted to the bolts 13.

On the surface on the outside in the vehicle width direction of the inner panel 6, a longitudinal wall part 18 is provided. The longitudinal wall part 18 is located along the periphery on the vehicle rear side (the side on which the rear door hinge 12 is installed) of the opening 11 and above the periphery. The longitudinal wall part 18 is formed by a surface parallel with the vehicle longitudinal direction and a surface substantially parallel with the vehicle width direction, which is adjacent to the surface parallel with the vehicle longitudinal direction. To the longitudinal wall part 18, a reinforcing member 15 having a substantially L-shaped cross section as viewed from the vehicle vertical direction is joined along the inner surface shape of the inner panel 6. The reinforcing member 15 is joined by spot welding at a plurality of locations (locations indicated by * marks in FIGS. 2 and 4). The longitudinal wall part 18 is reinforced by the reinforcing member 15. Also, as shown in FIG. 1, the reinforcing member 15 is joined to the side distant from the floor cross member 16 in the vehicle longitudinal direction with respect to the opening 11 of the inner panel 6.

The seat belt retractor 10 is a device for retracting a seat belt (not shown). The seat belt retractor 10 tends to be of increased size because of being provided additionally with various safety devices. Accordingly, the opening 11 formed in the center pillar 1 incorporating the seat belt retractor 10 also tends to increase in size.

On the other hand, in order to facilitate a passenger getting into and getting out of a rear seat, the rear door opening 5 must have a large opening area. However, an increase in the rear door opening area decreases the width W (refer to FIGS. 3 and 5) between the peripheral edge of the opening 11 of the center pillar 1 and the peripheral edge of the rear door opening 5, so that the strength of that portion is weakened, and there arises a large difference in strength between that portion and a portion above the opening 11 of the center pillar 1. Therefore, in the case of the application of an impact load F shown in FIG. 1 to the center pillar 1 from the side at the time of a side collision of a vehicle, a portion around the opening 11 having a low strength of the inner panel 6 is deformed greatly to the inside of the vehicle compartment.

Also, since the rear door hinge 12 for supporting the rear door is attached to the vehicle rear side of the center pillar 1, the deformation (intrusion amount) of the lower part of the center pillar 1 to the inside of the vehicle compartment at the time of side collision of a vehicle tends to increase, especially on the vehicle rear side.

In the center pillar 1, high stresses concentrate on the vehicle rear side around the opening 11 of the inner panel 6 at the time of a side collision of a vehicle, whereby the deformation (intrusion amount) of that portion to the inside of the vehicle compartment is increased. In this embodiment, however, since the portion that has low strength and is deformed greatly is reinforced by the reinforcing member 15, the deformation of the center pillar 1 to the inside of the vehicle compartment at the time of side collision of a vehicle can be restrained. In this case, in this embodiment, since the reinforcing member 15 is joined to only the vehicle rear side (specifically, the side on which the deformation to the inside of the vehicle compartment at the time of side collision of a vehicle is large) of the opening 11 of the inner panel 6 in the center pillar 1, the increase in cost and weight can be kept at a minimum. Also, the deformation of the center pillar 1 to the inside of the vehicle compartment at the time of side collision of a vehicle can also be restrained.

In this embodiment, the reinforcing member 15 has a substantially L-shaped cross section as viewed from the vehicle vertical direction. The reinforcing member 15 is joined to the periphery of the opening 11 of the inner panel 6 and to the longitudinal wall part 18 substantially parallel with the vehicle width direction. Therefore, the resistance to the impact load F applied to the center pillar 1 from the side at the time of side collision of a vehicle can be enhanced, whereby the deformation of the center pillar 1 to the inside of the vehicle compartment can be restrained more effectively.

Furthermore, in this embodiment, the reinforcing member 15 is joined to the surface on the outside in the vehicle width direction of the inner panel 6 of the center pillar 1 (to the inner surface side of the pillar closed cross section). Therefore, when the flange 6a corresponding to the rear door opening 5 is spot welded with a welding gun 17 as shown in FIG. 4, the closed cross-sectional area of the center pillar 1 need not be decreased considering the interference of the reinforcing member 15 with the welding gun 17. (Conversely, in the case in which the reinforcing member 15 is joined to the outer surface side of the pillar closed cross section, the outer surface being the surface on the inside in the vehicle width direction of the inner panel 6, the cross-sectional shape viewed from the vehicle vertical direction of the inner panel 6 must be decreased by the thickness of the reinforcing member 15.) The longitudinal wall part 18 of the surface substantially parallel with the vehicle width direction of the inner panel 6 is brought close to the welding gun 17, and the cross-sectional shape viewed from the vehicle vertical direction of the inner panel 6 can be set so that the closed cross-sectional area of the center pillar 1 is at a maximum. Therefore, the strength and rigidity of the center pillar 1 can be enhanced. As a result, the deformation of the center pillar 1 to the inside of the vehicle compartment at the time of side collision of a vehicle can be restrained more effectively.

Also, in this embodiment, as shown in FIG. 1, the reinforcing member 15 is joined to the side distant from the floor cross member 16 in the vehicle longitudinal direction with respect to the opening 11 of the inner panel 6 (the distant side is reinforced). Therefore, the impact load F applied to the center pillar 1 at the time of side collision of a vehicle is transmitted from the center pillar 1 to the floor cross member 16 with high efficiency, so that the deformation of the center pillar 1 to the inside of the vehicle compartment caused by the impact load F is kept small.

In this embodiment, the reinforcing member 15 is joined to only the vehicle rear side of the opening 11 of the inner panel 6 in the center pillar 1. However, in the case in which the impact load F applied to the center pillar 1 from the side is high, the reinforcing member 15 may be joined additionally to a vehicle front portion of the opening 11.

Also, the reinforcing member 15 may be joined to not only the periphery of the opening 11 for the seat belt retractor 10 formed in the center pillar 1 but also the periphery of a portion in which the cross-sectional strength changes suddenly or discontinuously, for example, the periphery of a door hinge mounting hole or a door harness mounting hole, in order to reinforce these portions.

The above is a description of an embodiment in which the present invention is applied to the center pillar 1. The present invention can also be applied to a front pillar or a rear pillar in the same way.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Although specific terms are employed herein, they are used in a generic and descriptive sense only and not for purposes of limitation.

What is claimed is:

1. A pillar structure of a vehicle body, comprising:
   a pillar that forms a closed cross-sectional structure, the pillar comprising an outer panel and an inner panel and extending substantially along a vertical direction of the vehicle body, wherein the inner panel defines an opening therein, the opening having a periphery;
   a reinforcing member joined to a vehicle rear part of the periphery of the opening of the inner panel of the pillar; and
   a rear door hinge attached to a vehicle rear side of a portion that overlaps the opening in side view.

2. The pillar structure of a vehicle body according to claim 1, wherein the reinforcing member is configured so as to have a substantially L-shaped cross section as viewed in the vertical direction, and the reinforcing member is joined to the periphery of the opening of the inner panel and to a longitudinal wall part substantially parallel with a vehicle width direction.

3. The pillar structure of a vehicle body according to claim 1, wherein the reinforcing member is joined to a surface on an outside of the inner panel in a vehicle width direction.

4. The pillar structure of a vehicle body according to claim 1, wherein the reinforcing member is joined to a side of the opening of the inner panel that is distant from a floor cross member with respect to a vehicle longitudinal direction.

* * * * *